No. 680,832. Patented Aug. 20, 1901.
G. S., J. A. & W. K. BAKER.
APPARATUS FOR MIXING FLOUR, &c.
(Application filed Dec. 31, 1897.)
(No Model.)
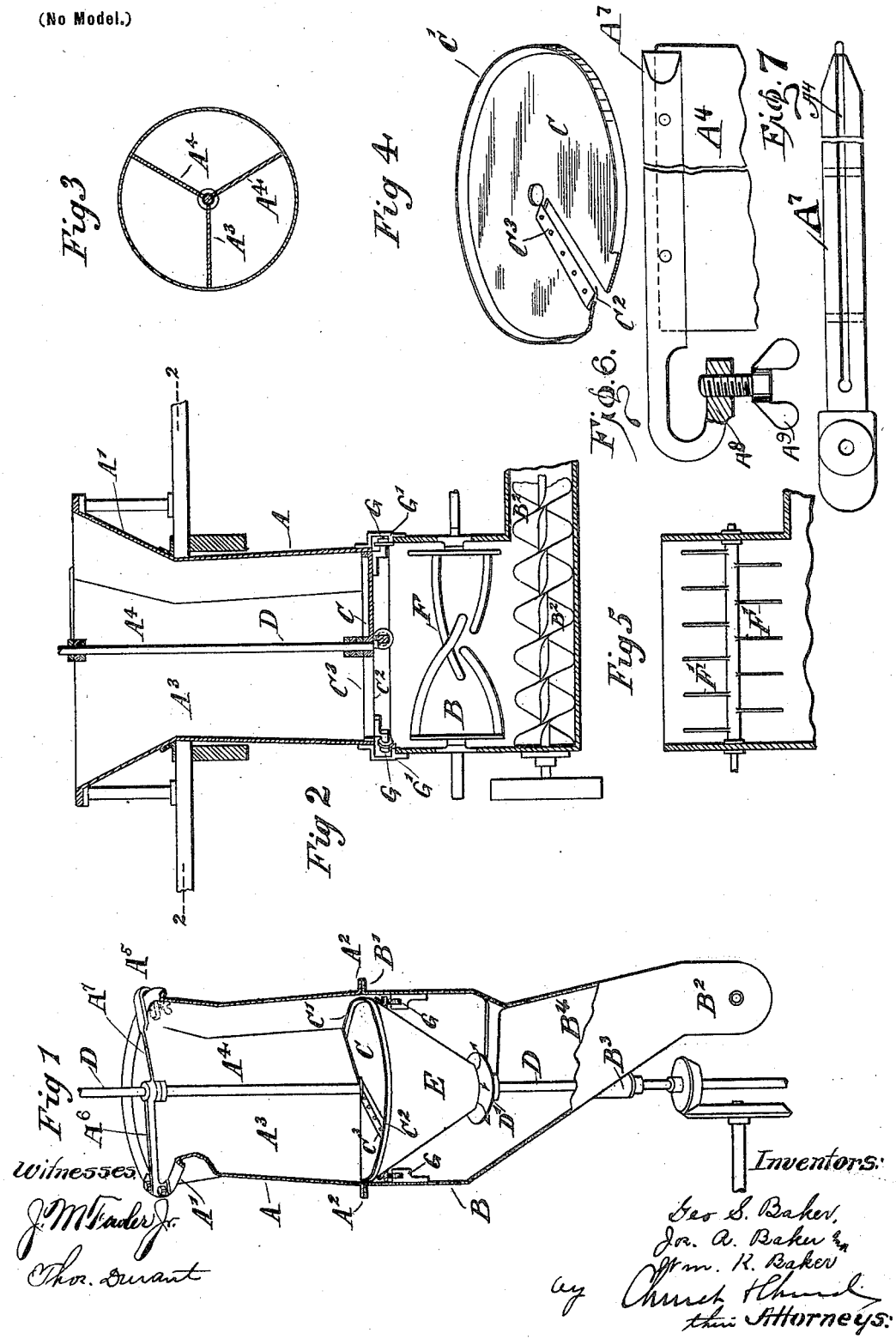

UNITED STATES PATENT OFFICE.

GEORGE SAMUEL BAKER, JOSEPH ALLEN BAKER, AND WILLIAM KING BAKER, OF LONDON, ENGLAND.

APPARATUS FOR MIXING FLOUR, &c.

SPECIFICATION forming part of Letters Patent No. 680,832, dated August 20, 1901.

Application filed December 31, 1897. Serial No. 665,223. (No model.)

*To all whom it may concern:*

Be it known that we, GEORGE SAMUEL BAKER, JOSEPH ALLEN BAKER, and WILLIAM KING BAKER, subjects of the Queen of England, residing at London, England, have invented a certain new and useful Improvement in Apparatus for Mixing Flour and other Material, (for which we have obtained Letters Patent of Great Britain under No. 18,959, dated October 22, 1892,) of which the following is a specification.

This invention relates to the mixing and proportioning of flour or other materials and the apparatus employed for the purpose.

In carrying the invention into practice we prefer to employ a slightly-tapered vessel set vertically with its larger end below and having a central vertical shaft, upon which are fixed a pair of half-disks curved after the manner of a screw-propeller, so that as they revolve they present cutting edges or faces, which shear off, as it were, portions of the materials to be mixed and allow them to fall into a lower receptacle, from which they may be conveyed by a worm or other conveyer and in which may revolve mixing-blades or the like. The bottom of the first vessel instead of being made of two plates may be made of a single one cut and curved in the necessary manner. The vessel is preferably divided throughout its length from the periphery to the shaft by one fixed partition and by one or more movable partitions, so that the whole vessel may be divided up into regular or irregular sized compartments, in which the materials to be mixed may be placed, and their proportions thus adjusted. The movable partitions may be adapted to slide or turn and be fixed in any required manner. For supporting the shaft and bottom a footstep may be employed or the bottom may be provided with a suitable number of projecting brackets carrying rollers adapted to run upon a circular rail or track provided for the purpose and preferably outside the vessel. If desired, two or more of the before-described apparatus may be connected with the same worm or conveyer.

In the accompanying drawings, Figure 1 is a vertical section of an apparatus constructed in accordance with this invention. Fig. 2 is a similar view of a modified form, Fig. 3 being a sectional plan upon line 2 2 of Fig. 2. Fig. 4 shows one of the cutting-disks. Fig. 5 is a view of a modified form of the stirrer shown in Fig. 2. Fig. 6 is a part-sectional elevation of the top of one of the adjustable partitions. Fig. 7 is a plan of the same.

Like letters represent like parts throughout the drawings.

A, Fig. 1, is the vessel, having its upper part A' tapered outward to act as a sort of hopper, while the main portion of the body A is tapered in the reverse direction, as shown, so as to prevent the materials adhering to the walls. A circular flange $A^2$ is shown at the bottom of A, and to this, by a similar flange B', is connected the bottom portion B of the apparatus, the two parts being bolted together or otherwise suitably connected. The vessel A is closed at its bottom $A^2$ by one or more circular or semicircular plates C, carried upon the central spindle D and revolving with it. The object of the plate C is to shear off the bottoms of the columns of materials contained in the vessel A, its exact form being not very important, so long as it effects this object. The faster it revolves the quicker the material will be sheared off and delivered from the apparatus. This plate may take the form of two half-plates, with the cutting edges slightly elevated or curved, after the manner of a screw-propeller, but with a very small pitch; but in practice we find that a plain flat plate, such as shown in Fig. 4, provided, if desired, with a raised edge C' and a radial slot $C^2$, over which is fastened a knife or cutting edge $C^3$, gives excellent results. Below the plate C is a tapered vessel or chamber E, which may be fixed or revolve with the shaft D, serving as a hopper to deliver the materials, already to a large extent mixed by the action of the cutting-plate C, onto the revolving plate D', carried upon the spindle D, which throws off the materials by centrifugal force, thus further mixing them, the process being still further carried on when they strike the walls of the case B and fall by the tapered extension $B^4$ to the worm conveyer $B^2$, by which they are conveyed away. The spindle D, carrying the disk D', may be part of the same spindle D carrying the disk C; but preferably it is separate from it and revolving in the opposite direction. The top of the hopper A' is flanged, as at A⁵. Projecting radially inward from the ring A⁵ is an arm A⁶, whose inner extremity forms a bearing for the shaft D, to the under side of which arm A⁶ is attached the fixed partition A³. Secured to arms A⁷ are the partitions A⁴. The arms A⁷ are formed with curved portions A⁸, which fit over the flange A⁵ and are held in any desired position on the flange by thumb-nuts A⁹. It will thus be seen that the partitions A⁴ may be moved around into any required position and held in adjusted position by means of the thumb-nuts, so that the space within the vessel A may be divided into compartments of various capacities. Supposing, therefore, that the vessel A were divided into three compartments and only two materials were to be treated in certain proportions, the third compartment may be entirely closed by turning the movable partitions A⁴.

In Fig. 2 the apparatus is substantially similar; but instead of the conical chamber E and revolving plate D' a stirring or mixing device F is shown. This may have curved blades, as shown in Fig. 2, and revolving on a horizontal axis or a simple horizontal shaft may carry rods or blades F', Fig. 5, for this purpose. In this case the spindle D cannot conveniently be carried down past the mixing device, and it may therefore be supported in any suitable form of foot-step bearing or bracket or upon rollers G, running upon a circular path G', so as to allow of its free revolution. Where the conical vessel E of Fig. 1 revolves, it may be carried in a similar manner by rollers G.

We claim—

1. In a mixing apparatus, the combination of a hopper, adjustable partitions in the hopper, a rotating cutter-plate forming the bottom of the partitioned portion of the hopper, a device for mixing the materials sheared off by the cutter-blade from the bottoms of the columns of the materials in the hopper, and the conveyer, as set forth.

2. In a mixing apparatus the combination of a hopper a fixed division-plate in the hopper, another division-plate attached to a radial arm pivoted about an axle central with the hopper, a rotary cutter-plate forming the bottom of the partition portion of the hopper, and a device for mixing the materials sheared off by the cutter-blade from the bottoms of the columns of the materials in the hopper, substantially as described.

3. In a mixing apparatus, the combination with the hopper, adapted to contain in separate compartments the materials to be mixed, a cutting apparatus located at the bottom of said hopper for shearing off the bottoms of the columns of materials in said hopper, a chamber or vessel, located below the hopper into which the materials from the hopper are discharged, and a means for mixing the materials discharged from the hopper; substantially as described.

4. In a mixing apparatus the combination with a hopper adapted to contain in separate compartments the materials to be mixed, a cutting apparatus located at the bottom of said hopper for shearing off the bottoms of the columns of materials in said hopper, a chamber or vessel located below the hopper into which the materials from the hopper are discharged, a shaft journaled in the walls of said chamber and capable of rotation therein and mixing-arms attached to the shaft, substantially as described.

In testimony whereof we have hereto set our hands in the presence of two subscribing witnesses.

GEORGE SAMUEL BAKER.
JOSEPH ALLEN BAKER.
WILLIAM KING BAKER.

Witnesses:
ALFRED J. BOULT,
HARRY B. BRIDAY.